United States Patent
Ono et al.

(10) Patent No.: US 11,043,905 B2
(45) Date of Patent: Jun. 22, 2021

(54) AC-AC POWER CONVERTER

(71) Applicant: NABTESCO CORPORATION, Tokyo (JP)

(72) Inventors: Yasuo Ono, Kyoto (JP); Michael Haider, Zurich (CH); Dominik Bortis, Zurich (CH); Johann W. Kolar, Zurich (CH)

(73) Assignee: NABTESCO CORPORATION, Tokyo (JP)

(*) Notice: Subject to any disclaimer, the term of this patent is extended or adjusted under 35 U.S.C. 154(b) by 0 days.

(21) Appl. No.: 16/295,496

(22) Filed: Mar. 7, 2019

(65) Prior Publication Data
US 2019/0280606 A1 Sep. 12, 2019

(30) Foreign Application Priority Data
Mar. 8, 2018 (JP) ................... 2018-042376

(51) Int. Cl.
*H02M 5/42* (2006.01)
*H02M 1/42* (2007.01)
*H02P 27/08* (2006.01)
*H02M 5/458* (2006.01)
(Continued)

(52) U.S. Cl.
CPC ............... *H02M 5/42* (2013.01); *H02M 1/14* (2013.01); *H02M 1/4208* (2013.01); *H02M 5/4585* (2013.01); *H02P 27/08* (2013.01); H02M 1/4225 (2013.01); H02M 2001/0003 (2013.01)

(58) Field of Classification Search
CPC .......... H02P 27/06; H02P 27/08; H02P 23/26; H02P 29/50; H02P 2201/03; H02P 27/04; H02P 6/085; H02M 5/4585; H02M 1/4208; H02M 1/14; H02M 5/42
See application file for complete search history.

(56) References Cited

U.S. PATENT DOCUMENTS

| | | | | |
|---|---|---|---|---|
| 6,198,240 B1* | 3/2001 | Notohara | ........... | B60H 1/00828 318/268 |
| 8,988,024 B2* | 3/2015 | Konig | ..................... | H02P 27/08 318/400.17 |
| 9,214,881 B2* | 12/2015 | Sekimoto | ................ | H02P 21/05 |

(Continued)

FOREIGN PATENT DOCUMENTS

| | | | |
|---|---|---|---|
| CN | 1317873 A | 10/2001 | |
| CN | 1578093 A | 2/2005 | |

(Continued)

OTHER PUBLICATIONS

Extended European Search Report corresponding to Application No. 19161559.0-1201; dated Aug. 2, 2019.
(Continued)

*Primary Examiner* — Thai T Dinh
(74) *Attorney, Agent, or Firm* — Cantor Colburn LLP

(57) ABSTRACT

An AC-AC power convertor converts a first AC voltage to a second AC voltage. A PFC rectifier circuit rectifies an AC voltage ($v_G$) so as to generate a rectified voltage. An inverter generates the second AC voltage from the rectified voltage. A controller controls the PFC rectifier circuit and the inverter such that power generated by the first AC voltage and the pulsations of power generated by the rectified voltage are output to an external device.

9 Claims, 11 Drawing Sheets

(51) Int. Cl.
  *H02M 1/14* (2006.01)
  *H02M 1/00* (2006.01)

(56) References Cited

U.S. PATENT DOCUMENTS

| | | | | |
|---|---|---|---|---|
| 9,933,842 | B2* | 4/2018 | Green | H02M 1/32 |
| 10,437,317 | B2* | 10/2019 | Green | H02P 29/02 |
| 10,651,774 | B2* | 5/2020 | Li | H02P 6/185 |
| 2001/0001227 | A1* | 5/2001 | Notohara | H02M 5/4585 |
| | | | | 318/268 |
| 2003/0098668 | A1* | 5/2003 | Jadric | H02M 5/458 |
| | | | | 318/801 |
| 2005/0007799 | A1* | 1/2005 | Schreiber | H02M 1/425 |
| | | | | 363/132 |
| 2011/0038192 | A1* | 2/2011 | Kawashima | H02M 1/4233 |
| | | | | 363/127 |
| 2013/0279216 | A1* | 10/2013 | Nguyen | H02M 1/14 |
| | | | | 363/41 |
| 2015/0354870 | A1* | 12/2015 | Lee | H02M 1/4225 |
| | | | | 62/498 |
| 2019/0052216 | A1* | 2/2019 | Tanaka | H02P 29/032 |

FOREIGN PATENT DOCUMENTS

| | | |
|---|---|---|
| EP | 1396927 A1 | 3/2004 |
| JP | 11289769 A | 10/1999 |
| JP | 2003284387 A | 10/2003 |

OTHER PUBLICATIONS

EPO Office Action issued to corresponding EP Application No. 19161559.0; dated Mar. 25, 2020.
Yoshiya Ohnuma et al., "Novel control strategy for single-phase to three-phase power converter using an active buffer", 13th European Conference on Power Electronics and Applications, 2009: EPE '09; Sep. 8-10, 2009, Barcelona, Spain, IEEE, Piscataway, NJ, USA, Sep. 8, 2009, pp. 1-10, XP031541329, ISBN: 978-1-4244-4432-8.
CNIPA 1st Office Action for corresponding CN Application No. 201910176619.0, dated Nov. 3, 2020.

* cited by examiner

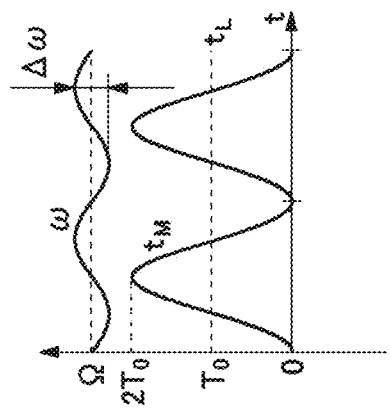
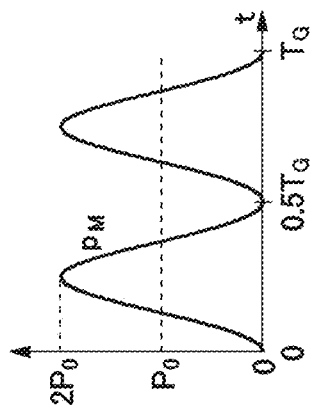
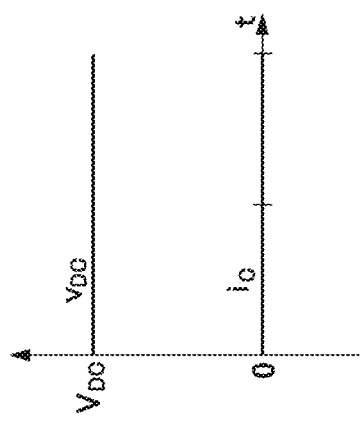
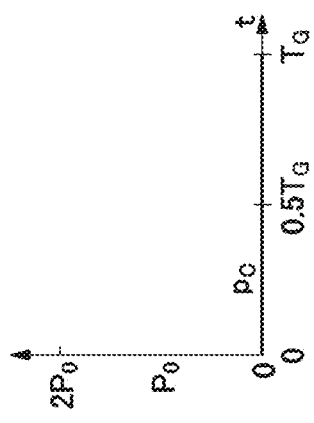
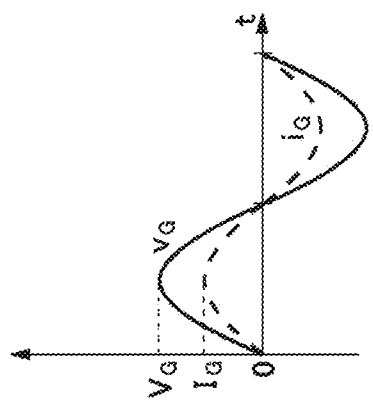
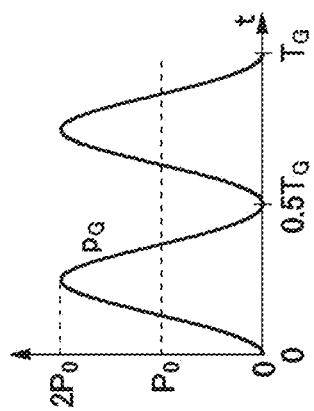
FIG.6A  FIG.6B  FIG.6C

AC-AC POWER CONVERTER

CROSS REFERENCE TO RELATED APPLICATIONS

The present application claims priority under 35 U.S.C. § 119 to Japanese Patent Application No. 2018-042376, filed on Mar. 8, 2018 is incorporated herein by reference in its entirety.

BACKGROUND OF THE INVENTION

1. Field of the Invention

The present invention relates to an AC-AC power converter that converts electric power from a single-phase AC power source into three-phase AC power.

2. Description of the Related Art

Those that includes a rectifier circuit, a smoothing capacitor, and an inverter circuit are disclosed as AC-AC power converters that convert electric power from a single-phase AC power source into three-phase AC power (see, for example, Patent Document 1).

[Patent Document 1] Japanese Patent Application Publication No. H11-289769

[Patent Document 2] Japanese Patent Application Publication No. 2003-284387

Many power source devices that supply AC power of a several kW class convert AC power that is input from a single-phase power source into three-phase AC power and output the three-phase AC power. Such an AC-AC power converter is usually formed including a rectifier circuit for converting electric power from an AC power source into DC power and an inverter circuit for converting rectified DC power into AC power of a desired specification.

However, when single-phase to three-phase power conversion is performed, a difference occurs inevitably between input power and output power, and pulsations therefore occurs in the power. A buffer becomes necessary in order to absorb and compensate for the pulsations. Conventionally, it is a common practice to form this buffer using a large capacity DC link capacitor. When the AC-AC power converter operates at several kW and several 100 V, the capacity required for the DC link capacitor is of the order of mF. In order to realize this, it is necessary to use a large-capacity electrolytic condenser. However, since electrolytic condensers have a large volume and a short life, electrolytic condensers have a great disadvantage in terms of size, cost, device life, and the like. Therefore, there is a need for an AC-AC power converter that does not require an electrolytic condenser.

Examples of prior art that realize such an electrolytic condenser-less AC-AC power converter include those having a component composed of a small capacitor, an inductor, and a switch element that is added to a DC link portion so as to compensate only for power pulsations by the additional circuit. Due to this additional circuit, the role required for the DC link capacitor is limited to the removal of switching noise etc. Thus, a large capacity electrolytic condenser is unnecessary. However, this technique has problems such as an increase in component cost associated with the additional circuit and complication of control.

As another example of the prior art, there is a technique that realizes appropriate motor control by supplying pulsations of input power directly to a DC link voltage and controlling the switching of an inverter even when the DC voltage of a DC link has pulsations (see, for example, Patent Document 2). In other words, in this technique, the inertia of a motor or its load is used as a compensation means for power pulsations. According to this technique, electrolytic condensers can be omitted without requiring special additional components. However, in this technique, since the DC voltage of the DC link pulsates greatly, a DC booster circuit cannot be applied. Therefore, there is a problem that an output voltage higher than an input voltage cannot be obtained, which limits the applicability of the motor.

SUMMARY OF THE INVENTION

In this background, a purpose of the present invention is to reduce the capacity of a DC link capacitor of an AC-AC power converter without requiring additional components.

An AC-AC power convertor according to one embodiment of the present invention is an AC-AC power convertor for converting a first AC voltage to a second AC voltage, including: a rectifier circuit for rectifying the first AC voltage to generate a rectified voltage; an inverter for generating the second AC voltage from the rectified voltage; and a controller for controlling the rectifier circuit and the inverter, wherein the controller controls the rectifier circuit and the inverter such that power generated by the first AC voltage and the pulsations of power generated by the rectified voltage are output to an external device.

Optional combinations of the aforementioned constituting elements, and implementations of the invention in the form of methods, apparatuses, programs, transitory or non-transitory storage media, systems, and the like may also be practiced as additional modes of the present invention.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which:

FIG. 6A is a diagram showing changes over time of an input voltage, an input current, and input power of the AC-AC power converter of FIG. 1; FIG. 6B is a diagram showing changes over time of a DC link capacitor voltage, a DC link capacitor current, and DC link capacitor power of the AC-AC power converter of FIG. 1; FIG. 6C is a diagram showing changes over time of motor rotation speed, motor torque, and motor power in FIG. 1;

DETAILED DESCRIPTION OF THE INVENTION

The invention will now be described by reference to the preferred embodiments. This does not intend to limit the scope of the present invention, but to exemplify the invention.

In the following embodiments, like numerals represent like constituting elements, and duplicative explanations will be omitted. For the sake of ease of explanation, some constituting elements are appropriately omitted in the figures. Unless otherwise specified, with respect to a numerical value A, <A> represents the average value of A, and A* represents the target value of A.

Figure 1:
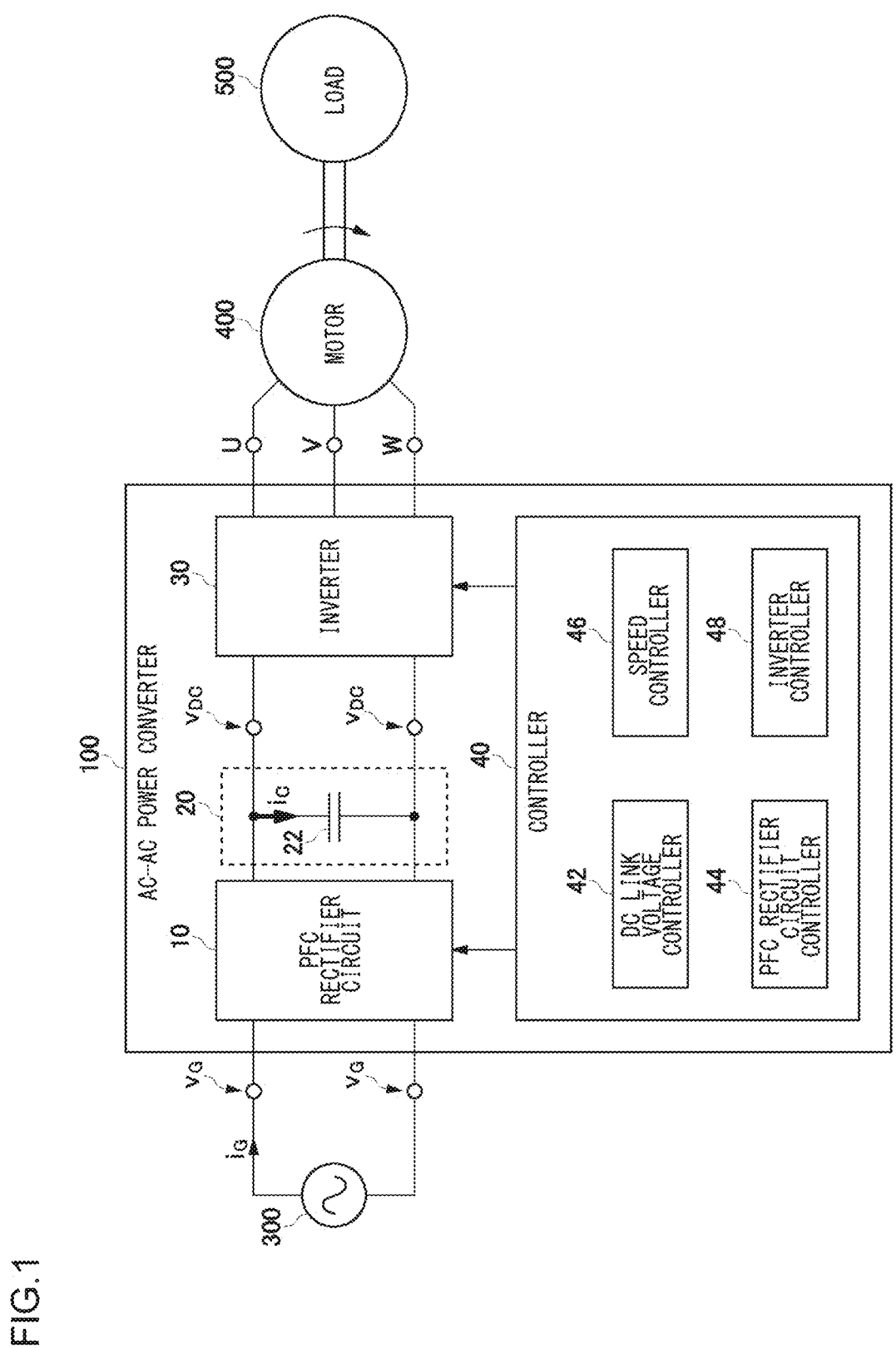
FIG. 1 is a block diagram showing an AC-AC power converter according to an embodiment.

FIG. 1 is a block diagram showing an example of an AC-AC power converter 100 according to an embodiment. The AC-AC power converter 100 functions as a power converter that generates three-phase power based on power from a single-phase power source 300. As an example, the AC-AC power converter 100 can be used to drive a variety of devices such as pumps, compressors, electric actuators of ships and aircrafts, robotic arms, and the like. The AC-AC power converter 100 includes a PFC rectifier circuit 10, a DC link 20, an inverter 30, and a controller 40. The three-phase power generated by the AC-AC power converter 100 is output to an external device such as a motor 400. The motor 400 is driven by the three-phase power that has been input and drives a load 500. In this specification, the upstream side may be referred to as upstream or input, and the downstream side may be referred to as downstream or output in accordance with the flow of electric power or a signal flowing from the single-phase power source 300 to the output of three-phase power.

The single-phase power source 300 may be, for example, a commercial power source or a generator. The single-phase power source 300 outputs an input voltage $v_G$ to the PFC rectifier circuit 10 of the AC-AC power converter 100.

The PFC rectifier circuit 10 is a rectifier circuit having a PFC (Power Factor Correction) function and may be implemented using a publicly-known technique. The PFC rectifier circuit 10 performs full-wave rectification on the input voltage $v_G$ that has been input from the single-phase power source 300 so as to generate a rectified voltage and then removes high frequencies from a current waveform using the PFC function. The PFC rectifier circuit 10 outputs the rectified voltage to the DC link 20.

The DC link 20 is arranged downstream of the PFC rectifier circuit 10 and includes a DC link capacitor 22. The DC link capacitor 22 is a small-capacity condenser constituted of, for example, a film or a ceramic condenser. The DC link capacitor 22 functions as a means for removing switching noise or the like. Since pulsations are removed by the control described later in the rectified voltage, the DC link capacitor 22 does not need to be a large-capacity electrolytic condenser. The DC link 20 outputs a DC link voltage $v_{DC}$ to the inverter 30.

The inverter 30 is arranged downstream of the DC link 20 and generates a three-phase AC voltage based on the DC link voltage $v_{DC}$. The inverter 30 may be implemented using a publicly-known technique. The three-phase AC voltage is composed of, for example, a U phase, a V phase, and a W phase and may alternate with a phase difference of $2\pi/3$. The inverter 30 supplies the AC voltage that has been generated to the motor 400.

The controller 40 includes a DC link voltage controller 42, a PFC rectifier circuit controller 44, a speed controller 46, and an inverter controller 48. The controller 40 controls the PFC rectifier circuit 10 and the inverter 30 so as to adjust the input current, the rectified voltage, and the three-phase AC voltage that are generated. The details of the control by the controller 40 will be described later.

The motor 400 is driven by the three-phase power supplied from the inverter 30 and transmits motive power that has been obtained to the load 500 so as to move the load 500.

The load 500 is a load such as a flywheel, which is moved by the motor 400, and has inertia $J_{TOT}$ (for example, the moment of inertia).

The rectifier circuit does not necessarily have to have a PFC function. In other words, the PFC rectifier circuit 10 may be replaced by any type of rectifier circuit that generates a DC voltage from an AC voltage.

The DC link 20 may be completely omitted. In this case, the PFC rectifier circuit 10 outputs the rectified voltage to the inverter 30.

[Conventional Voltage Control]

Figure 2:
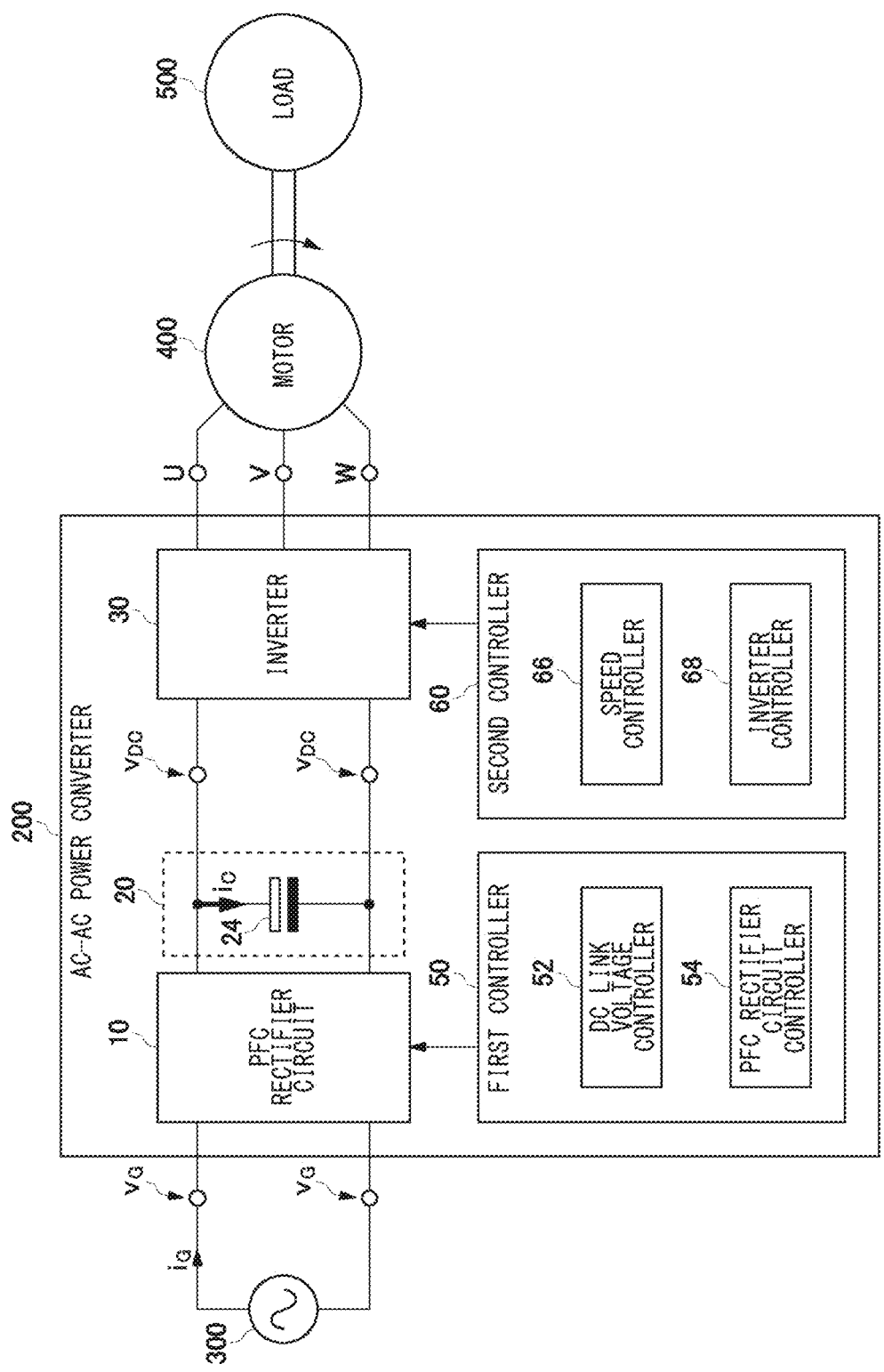
FIG. 2 is a block diagram showing a conventional AC-AC power converter.

Before describing voltage control by the AC-AC power converter according to the embodiment, voltage control by a conventional AC-AC power converter will be described. FIG. 2 is a block diagram showing a conventional AC-AC power converter 200. The first difference from the AC-AC power converter 100 of FIG. 1 is that a DC link capacitor 24 is constituted of a large-capacity electrolytic condenser. This is for the purpose of buffering the difference between input power and output power so as to compensate for the difference as described later. The second difference is that a controller 40, which is integrated in the AC-AC power converter 100 of FIG. 1, is separated into a first controller 50 and a second controller 60. The first controller 50 includes a DC link voltage controller 52 and a PFC rectifier circuit controller 54. The second controller 60 includes a speed controller 66 and an inverter controller 68. The first controller 50 independently controls the PFC rectifier circuit 10, and the second controller 60 independently controls the inverter 30. Other configuration of the AC-AC power converter 200 is the same as the configuration of the AC-AC power converter 100. In particular, it is to be noted that the controllers shown in FIG. 1 and FIG. 2 are abstract functional blocks, and any concrete implementation by hardware, software, or the like is not limited to these drawings.

Figure 3:
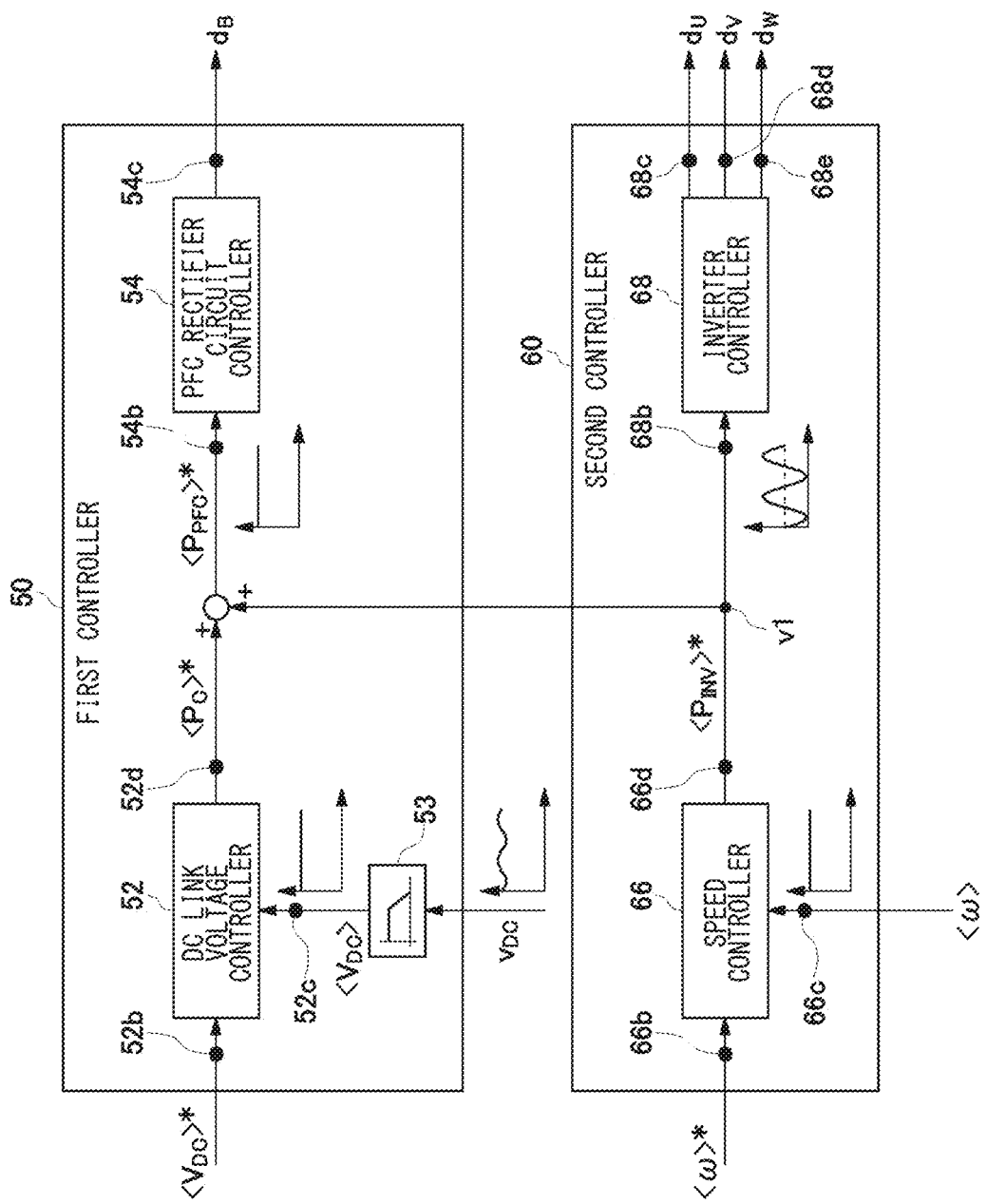
FIG. 3 is a block diagram showing controllers of the AC-AC power converter of FIG. 2.

FIG. 3 is a block diagram showing the first controller 50 and the second controller 60 of the AC-AC power converter 200 of FIG. 2. The DC link voltage controller 52 includes a first input terminal 52b, a second input terminal 52c, and an output terminal 52d. The PFC rectifier circuit controller 54 includes an input terminal 54b and an output terminal 54c. The speed controller 66 includes a first input terminal 66b, a second input terminal 66c, and an output terminal 66d. The inverter controller 68 includes an input terminal 68b, a first output terminal 68c, a second output terminal 68d, and a third output terminal 68e. The first controller 50 includes a low pass filter 53 on the upstream side of the second input terminal 52c of the DC link voltage controller 52.

The current DC link voltage $v_{DC}$ is input to the low pass filter 53. The low pass filter 53 removes high frequency components from $v_{DC}$, generates an average DC link voltage $<v_{DC}>$, and inputs the average DC link voltage $<v_{DC}>$ to the second input terminal 52c of the DC link voltage controller 52. A target average DC link voltage $<v_{DC}>^*$ is input to the first input terminal 52b of the DC link voltage controller 52. The DC link voltage controller 52 calculates a target average capacitor power $<P_C>^*$ based on the difference $\Delta v_{DC}$ (not shown) between $<V_{DC}>^*$ and $<v_{DC}>$ and outputs the target average capacitor power $<P_C>^*$ from the output terminal 52d.

A target average speed $<\omega>^*$ of the motor 400 is input to the first input terminal 66b of the speed controller 66. The current average speed $<\omega>$ of the motor 400 is input to the second input terminal 66c. The speed controller 66 calculates target average inverter output $<P_{INV}>^*$ based on the difference $\Delta\omega$ (not shown) between $<\omega>^*$ and $<\omega>$ and outputs the target average inverter output $<P_{INV}>^*$ from the output terminal 66d.

$<P_{INV}>^*$ output from the output terminal 66d of the speed controller 66 is branched into two at a branch point v1, and one is added to $<P_C>^*$ output from the output terminal 52d of the DC link voltage controller 52. As a result, a target average rectified power $<P_{PFC}>^*$ is calculated as $<P_{PFC}>^*=<P_{INV}>^*+<P_C>^*$. The calculated $<P_{PFC}>^*$ is input to the input terminal 54b of the PFC rectifier circuit controller 54. The other $<P_{INV}>^*$ branched at the branch point v1 is input to the input terminal 68b of the inverter controller 68.

The PFC rectifier circuit controller 54 calculates a target input current $i_G^*$ (not shown) based on the target average rectified power $<P_{PFC}>^*$ that has been input, obtains a PFC output duty ratio $d_B$ from the inductor current difference, and outputs the PFC output duty ratio $d_B$ from the output terminal 54c. The PFC output duty ratio $d_B$ that has been output is input to the PFC rectifier circuit 10 via a pulse width modulator (not shown) such that desired control is realized.

The inverter controller 68 obtains inverter output duty ratios $d_U$, $d_V$ and $d_W$ based on the target motor power $<P_{INV}>^*$ that has been input and outputs the duty ratios $d_U$, $d_V$ and $d_W$ to the first output terminal 68c, the second output terminal 68d, and the third output terminal 68e, respectively. The inverter output duty ratios $d_U$, $d_V$ and $d_W$ that have been output are input to the inverter 30 via a pulse width modulator (not shown) such that desired control is realized.

Figures 4A, 4B, 4C:
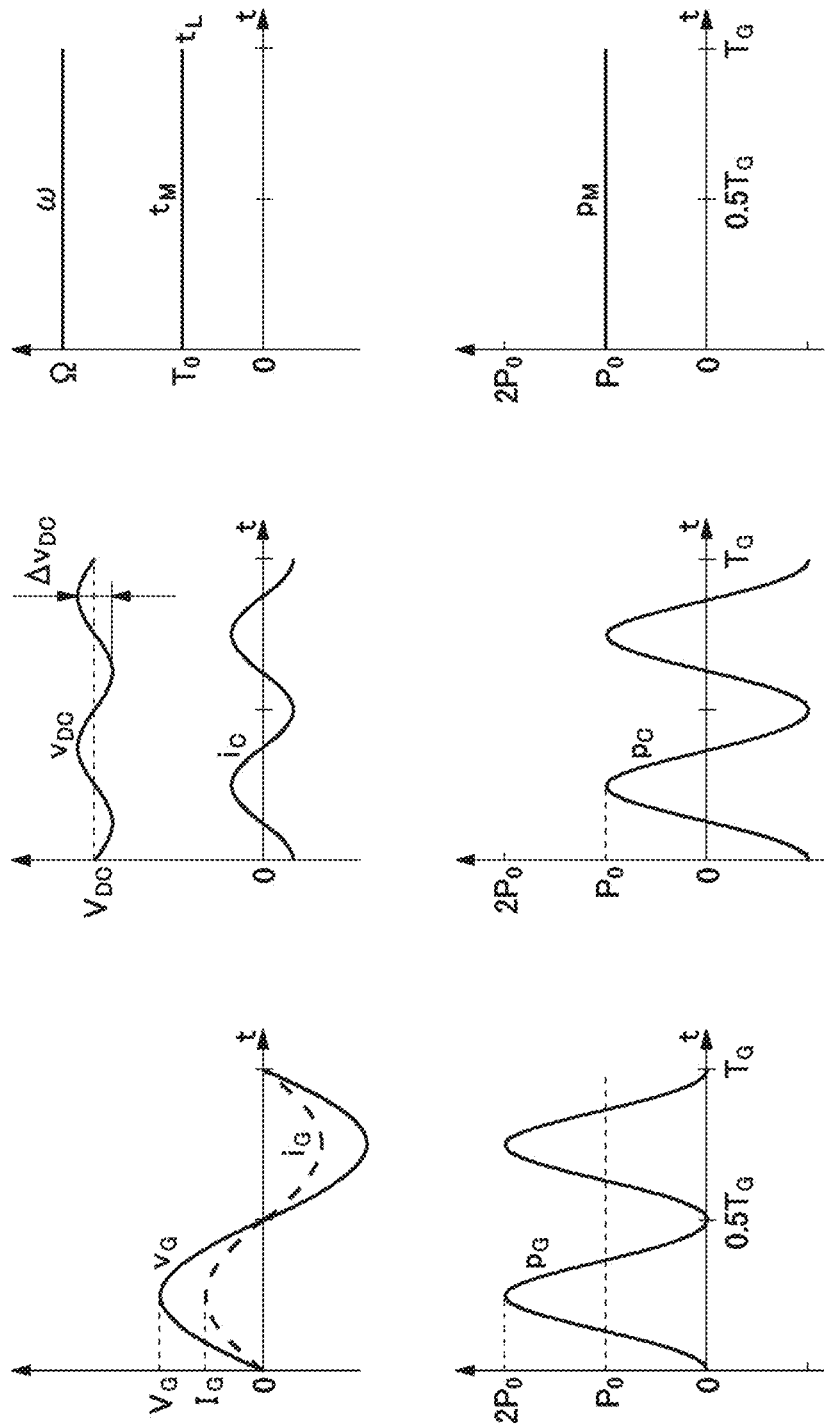
FIG. 4A is a diagram showing changes over time of an input voltage, an input current, and input power of the AC-AC power converter of FIG. 2.
FIG. 4B is a diagram showing changes over time of a DC link capacitor voltage, a DC link capacitor current, and DC link capacitor power of the AC-AC power converter of FIG. 2.
FIG. 4C is a diagram showing changes over time of motor rotation speed, motor torque, and motor power in FIG. 2.

FIG. 4A shows changes over time of an input voltage, an input current, and input power of the AC-AC power converter 200 of FIG. 2. FIG. 4B shows changes over time of a DC link capacitor voltage, a DC link capacitor current, and DC link capacitor power of the AC-AC power converter 200 of FIG. 2. FIG. 4C shows changes over time of motor rotation speed, motor torque, and motor power in FIG. 2.

In this specification, it is given that the input voltage (AC voltage supplied by the single-phase power source 300) $v_G$ forms a sinusoidal wave having an amplitude $V_G$ and a frequency $f_G$ and is expressed as follows.

$v_G=V_G^*\sin(2\pi f_G t)$ In order to satisfy a condition where the power factor equals 1, the input current $i_G$ that is input to the PFC rectifier circuit 10 is controlled so as to form a sinusoidal wave having the same frequency and the same phase as those of $v_G$. That is, when the amplitude is denoted as $I_G$, $i_G$ is expressed as follows.

$i_G=I_G^*\sin(2\pi f_G t)$

Therefore, input power $p_G$ that is input to the PFC rectifier circuit 10 is as follows.

$p_G=V_G^*i_G=V_G^*\sin(2\pi f_G t)^*I_G^*\sin(2\pi f_G t)=P_0^*(1-\cos(2\pi^*2f_G t))$ Note that it is given that $P_0=V_G^*I_G/2$. As described, the input power $p_G$ vibrates at a frequency $2f_G$, which is twice the frequency $f_G$ of the input voltage $v_G$. On the other hand, motor power $p_M$ is controlled by the second controller 60 so as to be a temporally constant value $P_0$ (average value of input power $p_G$).

As shown in FIG. 4A and FIG. 4C, the respective waveforms of the input power $p_G$ and the motor power $p_M$ do not match. The DC link capacitor 24 of the DC link 20 compensates for the difference between this input power $p_G$ and the motor power $p_M$ by buffering the difference. Regarding this point, an explanation will be given in the following. The DC link capacitor 24 accumulates electrostatic energy $E_C$ inside thereof.

$E_C=\frac{1}{2}^*C_{DC}^*v_{DC}^2$

Note that the capacity of the DC link capacitor 24 is denoted as $C_{DC}$. As a result, the condenser current is flows through the DC link 20. Then, a DC link voltage pulsation $\Delta v_{DC}$ (ripple) vibrating at a frequency $2f_G$, which is twice the frequency $f_G$ of the input voltage $v_G$, occurs in the DC link voltage $v_{DC}$. The DC link voltage pulsation $\Delta v_{DC}$ depends on the average output power $P_0$, the average DC link voltage $V_{DC}$, the frequency $f_G$ of the input voltage $v_G$, and the capacity $C_{DC}$ of the DC link capacitor 24 and is expressed as follows.

$$\Delta V_{DC} = \frac{P_0}{2\pi f_G} \cdot \frac{1}{V_{DC} C_{DC}} \quad (1)$$

In other words, in order to compensate for this pulsation so as to suppress the pulsation, it is necessary to sufficiently increase the capacity $C_{DC}$ of the DC link capacitor 24. In general, in order to realize a normal inverter function, it is necessary to suppress the DC link voltage pulsation $\Delta v_{DC}$ within several percent of the average DC link voltage $V_{DC}$. According to Equation 5, for example, when $P_0$ is 5 kW, $V_{DC}$ is 100 V, and $f_G$ is 50 Hz, it is found that $C_{DC}$ of about 3 mF is required when $\Delta v_{DC}/V_{DC}$ is suppressed to 5 percent.

[Voltage Control According to Embodiment]

Figure 5:
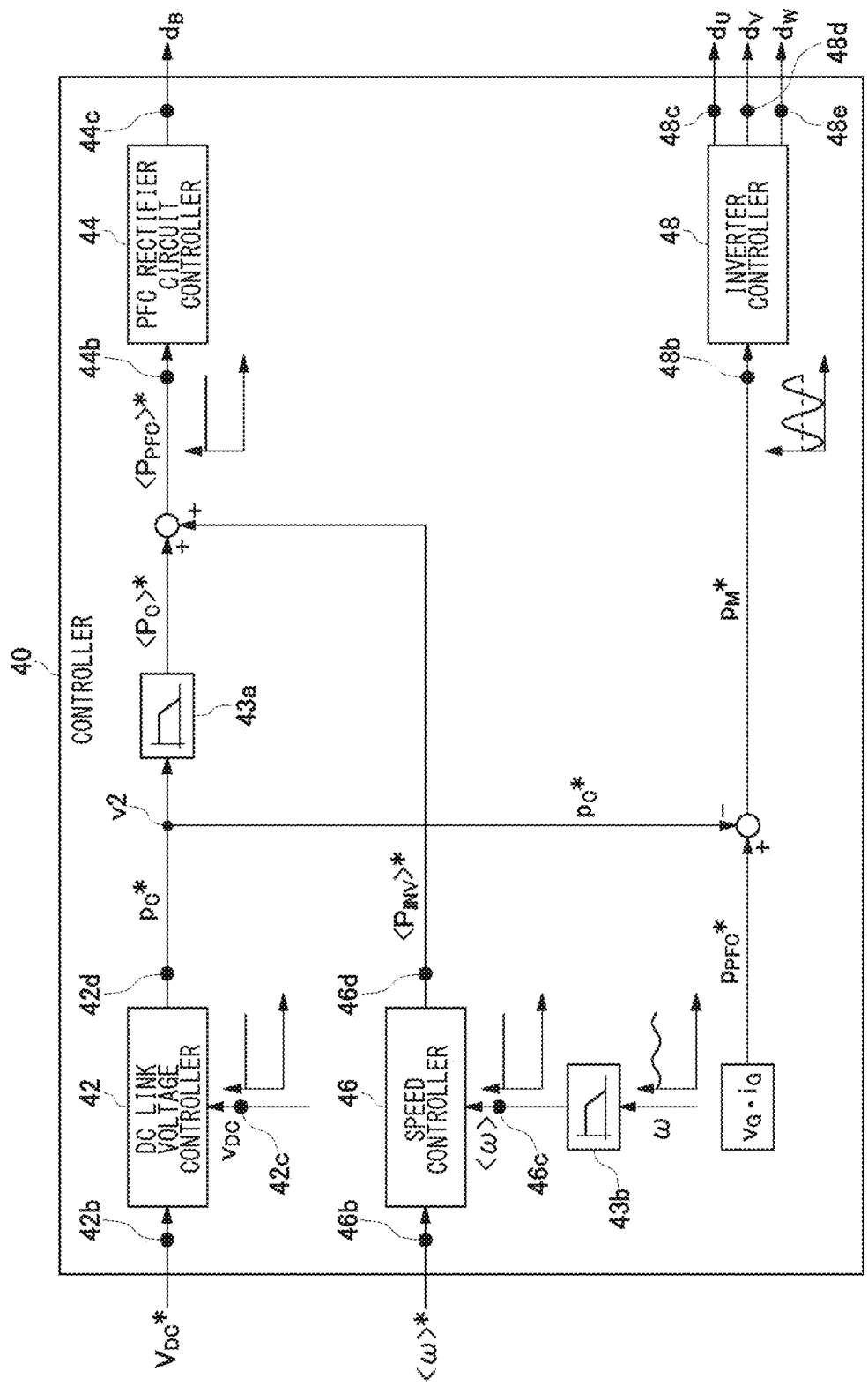
FIG. 5 is a block diagram showing a controller of the AC-AC power converter of FIG. 1.

Voltage control according to the embodiment of the present invention will be described. FIG. 5 is a block diagram showing the controller of the AC-AC power converter 100 of FIG. 1. The DC link voltage controller 42 includes a first input terminal 42b, a second input terminal 42c, and an output terminal 42d. The PFC rectifier circuit controller 44 includes an input terminal 44b and an output terminal 44c. The speed controller 46 includes a first input terminal 46b, a second input terminal 46c, and an output terminal 46d. The inverter controller 48 includes an input terminal 48b, a first output terminal 48c, a second output terminal 48d, and a third output terminal 48e. The controller 40 includes a low pass filter 43a between the output terminal 42d of the DC link voltage controller 42 and the input terminal 44b of the PFC rectifier circuit controller 44. The controller 40 includes a low pass filter 43b on the upstream side of the second input terminal 46c of the speed controller 46.

A target DC link voltage $v_{DC}^*$ is input to the first input terminal 42b of the DC link voltage controller 42. The current DC link voltage $v_{DC}$ is input to the second input terminal 42c. As will be described later, the DC link voltage $v_{DC}$ is controlled so as to be a temporally constant value (having no pulsation). Therefore, unlike the AC-AC power converter 200 in FIG. 2, a low pass filter for eliminating high frequency components does not need to be placed upstream of the second input terminal 42c. The DC link voltage controller 42 obtains target capacitor power $p_C$* based on the difference $\Delta v_{DC}$ (not shown) between $v_{DC}$* and $v_{DC}$ and outputs the target capacitor power $p_C$* from the output terminal 42d.

The target capacitor power $p_C$* that is output from the output terminal 42d of the DC link voltage controller 42 is branched into two at a branch point v2, and one is input to the low pass filter 43a. $p_C$* generated by the DC link voltage controller 42 includes high frequency voltage noise that is caused by noise caused by the inductor of the motor, noise of the input power source, or the like. The low pass filter 43a removes these high frequency components from $p_C$* to generate the target average capacitor power $<P_C>$* and outputs the target average capacitor power $<P_C>$*. The other $p_C$* branched at the branch point v2 is subtracted from target rectified power $p_{PFC}$* so as to calculate target motor power $p_M$* ($p_M$*=$p_{PFC}$*−$p_C$*). The $p_M$* that has been calculated is input to the input terminal 48b of the inverter controller 48.

As described above, the target motor power $p_M$* that is input to the inverter controller 48 is obtained by subtracting the target capacitor power $p_C$* from the target rectified power $p_{PFC}$*. In other words, the input power $p_G$ and the pulsation $\Delta p_{DC}$ of the DC link are input to the motor 400. The motor 400 compensates for this pulsation by the inertia possessed by the load 500. As a result, the pulsations of the DC link become zero, and $p_M$=$p_G$ is established. In other words, the motor power $p_M$ agrees with the input power $p_G$.

As described later, the speed ω of the motor pulsates at the frequency $2f_G$, which is twice the frequency $f_G$ of the input power $p_G$, due to compensation of the input power $p_G$ by the motor 400. Accordingly, high frequency components of ω are removed using a low pass filter as shown in the following. The current motor speed ω is input to the low pass filter 43b. The low pass filter 43b removes the high frequency components from w to generate the current average speed <ω> of the motor and inputs the current average speed <ω> to the second input terminal 46c of the speed controller 46. A target average speed <ω>* of the motor 400 is input to the first input terminal 46b of the speed controller 46. The speed controller 46 obtains target average inverter output $<P_{INV}>$* based on the difference Δω (not shown) between <ω>* and <ω> and outputs the target average inverter output $<P_{INV}>$* from the output terminal 46d.

The target average inverter output $<P_{INV}>$* that has been output from the output terminal 46d of the speed controller 46 is added to the target average capacitor power $<P_C>$* that has been output from the low pass filter 43a. As a result, the target average rectified power $<P_{PFC}>$* is calculated as $<P_{PFC}>$*=$<P_C>$*+$<P_{INV}>$*. The calculated $<P_{PFC}>$* is input to the input terminal 44b of the PFC rectifier circuit controller 44. The PFC rectifier circuit controller 44 calculates a target input current $i_G$* (not shown) based on the target average rectified power $<P_{PFC}>$* that has been input, obtains a PFC output duty ratio $d_B$ from the inductor current difference, and outputs the PFC output duty ratio $d_B$ from the output terminal 44c. The PFC output duty ratio $d_B$ that has been output is input to the PFC rectifier circuit 10 via a pulse width modulator (not shown) such that desired control is realized.

The inverter controller 48 obtains inverter output duty ratios $d_U$, $d_V$ and $d_W$ based on the target motor power $p_M$* that has been input and outputs the inverter output duty ratios $d_U$, $d_V$ and $d_W$ to the first output terminal 48c, the second output terminal 48d, and the third output terminal 48e, respectively. The inverter output duty ratios $d_U$, $d_V$ and $d_W$ that have been output are input to the inverter 30 via a pulse width modulator (not shown) such that desired control is realized.

FIG. 6A shows changes over time of an input voltage, an input current, and input power of the AC-AC power converter 100 of FIG. 1. FIG. 6B shows changes over time of a DC link capacitor voltage, a DC link capacitor current, and DC link capacitor power of the AC-AC power converter 100 of FIG. 1. FIG. 6C shows changes over time of motor rotation speed, motor torque, and motor power in FIG. 1.

Since FIG. 6A is the same as FIG. 4A, the explanation thereof will be omitted. As described above, since the motor power $p_M$ and the input power $p_G$ are controlled so as to coincide with each other, the respective waveforms of $p_M$ and $p_G$ coincide with each other (FIG. 6A and FIG. 6C). In other words, $p_M$ vibrates at a frequency $2f_G$, which is twice the frequency $f_G$ of the input voltage $v_G$. Since $p_M$=$p_G$ is established, the DC link capacitor power $p_C$ becomes zero (FIG. 6B). Therefore, the DC link capacitor current is does not flow, and the DC link capacitor voltage $v_{DC}$ has a temporally constant value. As described above, according to the voltage control of the present embodiment, the pulsation $\Delta v_{DC}$ does not occur in the DC link voltage. Therefore, a large-capacity electric field condenser for compensating for this is unnecessary.

Since the motor power $p_M$ vibrates at the frequency $2f_G$, the motor torque $t_M$ also vibrates at the frequency $2f_G$ (FIG. 6C). When the motor torque $t_M$ is larger than the load torque $t_L$=$T_0$, the load 500 is accelerated, and the energy of the motor is converted into the following kinetic energy $E_{KIN}$.

$$E_{KIN} = \tfrac{1}{2} * J_{TOT} * \omega^2$$

Conversely, when the motor torque $t_M$ is smaller than the load torque $t_L$=$T_0$, the load 500 is decelerated, and the kinetic energy $E_{KIN}$ of the load 500 is supplied to the motor 400. In this way, the speed ω of the motor 400 has a pulsation (ripple) Δω vibrating at the frequency $2f_G$ around the average speed Ω. The pulsation Δω of this motor speed depends on the average motor power $P_0$, the average speed Ω, the frequency $f_G$ of the input voltage $v_G$, and the inertia $J_{TOT}$ and is expressed as follows.

$$\Delta\omega = \frac{P_0}{2\pi f_G} \cdot \frac{1}{\Omega J_{TOT}} \quad (2)$$

In other words, by applying a load having a sufficiently large inertia, the pulsation can be compensated for and suppressed.

As described above, according to the AC-AC power converter according to the embodiment, by compensating for the power pulsation using the motor or the inertia of the load, the DC link voltage can be set to a temporally constant value while the target average speed of the motor is being output. Thereby, the capacity of the DC link capacitor can be reduced without requiring additional components.

Described above is an explanation given based on the embodiment of the present invention. The embodiment is intended to be illustrative only, and it will be obvious to those skilled in the art that various modifications and changes can be developed within the scope of the claims of the present invention and that such modifications and changes are also within the scope of the claims of the present invention. Therefore, the descriptions and figures in the specification should be treated demonstratively instead of being treated in a limited manner.

An explanation will be given in the following regarding exemplary variations. In the figures and explanations of the exemplary variations, the same or equivalent constituting elements and members as those in the embodiment shall be denoted by the same reference numerals. Explanations that are the same as those in the embodiment are appropriately omitted, and an explanation will be given focusing on features that are different from those of the embodiment.

(First Exemplary Variation)

In the above-described embodiment, the pulsations of the input power and the pulsations of the DC link power are input to the motor, and the voltage pulsations of the DC link are compensated for using the motor or the inertia of the load. However, the present invention is not limited thereto. For example, only the pulsations of the DC link may be extracted and input to the motor. Also in this case, the voltage pulsations of the DC link can be absorbed and compensated for using the motor or the inertia of the load.

Figure 7:
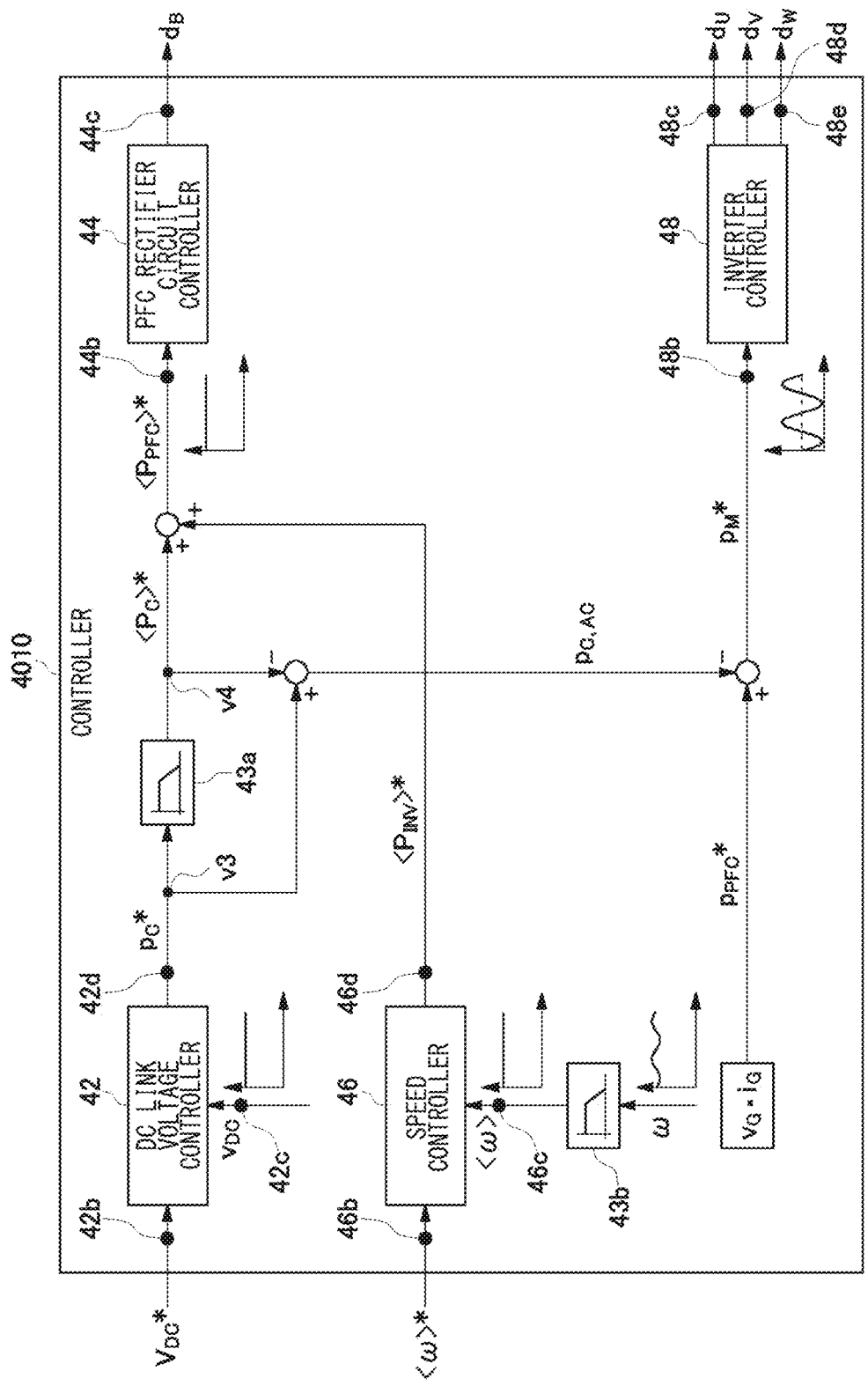
FIG. 7 is a block diagram showing an exemplary variation of the controller of the AC-AC power converter of FIG. 1.

FIG. 7 is a block diagram showing a controller 4010, which is an exemplary variation of the controller 40 of the AC-AC power converter 100 of FIG. 1. The component configuration of the controller 4010 is the same as the component configuration of the controller 40 of FIG. 5. In the following, an explanation will be given regarding the flow of control and a signal while focusing on differences from FIG. 5.

The target capacitor power $P_C^*$ that is output from the output terminal 42d of the DC link voltage controller 42 is branched into two at a branch point v3, and one is input to the low pass filter 43a. The low pass filter 43a removes high frequency components from $P_C^*$ to generate the target average capacitor power $<P_C>^*$ and outputs the target average capacitor power $<P_C>^*$. $<P_C>^*$ output from the low pass filter 43a is branched into two at a branch point v4, and one is added to the target average inverter output $<P_{INV}>^*$ output from the output terminal 46d of the speed controller 46. As a result, the target average rectified power $<P_{PFC}>^*$ is calculated as $<P_{PFC}>^* = <P_C>^* + <P_{INV}>^*$. The calculated $<P_{PFC}>^*$ is input to the input terminal 44b of the PFC rectifier circuit controller 44. The other $<P_C>^*$ branched at the branch point v4 is subtracted from the other $P_C^*$ branched at the branch point v3, and an input power pulsation $p_{C,AC}$ is generated. In other words, the input power pulsation $p_{C,AC}$ is obtained by extracting only the pulsation part from the target capacitor power $P_C^*$. The input power pulsation $p_{C,AC}$ is subtracted from the target rectified power $p_{PFC}^*$ so as to calculate target motor power $p_M^*$ ($p_M^* = p_{PFC}^* - p_{C,AC}$). $p_M^*$ that has been calculated is input to the input terminal 48b of the inverter controller 48.

As described above, the target motor power $p_M^*$ that is input to the inverter controller 48 is obtained by subtracting the input power pulsation $p_{C,AC}$ from the target rectified power $p_{PFC}$. In other words, the pulsation $\Delta p_{DC}$ of the DC link is input to the motor 400. The motor 400 compensates for this pulsation by the inertia possessed by the load 500. As a result, the pulsations of the DC link become zero, and $p_M = p_G$ is established. In other words, the motor power $p_M$ agrees with the input power $p_G$.

The PFC rectifier circuit controller 44 calculates a target input current $i_G^*$ (not shown) based on $<P_{PFC}>^*$ that has been input, obtains a PFC output duty ratio $d_B$ from the inductor current difference, and outputs the PFC output duty ratio $d_B$ from the output terminal 44c. The PFC output duty ratio $d_B$ that has been output is input to the PFC rectifier circuit 10 via a pulse width modulator (not shown) such that desired control is realized.

The inverter controller 48 obtains inverter output duty ratios $d_U$, $d_V$ and $d_W$ based on the target motor power $p_M^*$ that has been input and outputs the inverter output duty ratios $d_U$, $d_V$ and $d_W$ to the first output terminal 48c, the second output terminal 48d, and the third output terminal 48e, respectively. The inverter output duty ratios $d_U$, $d_V$ and $d_W$ that have been output are input to the inverter 30 via a pulse width modulator (not shown) such that the control is realized.

As described above, also in this exemplary variation, by compensating for the voltage pulsations of the DC link by the motor, the motor power $p_M$ is controlled to be equal to the input power $p_G$ in the same way as in the above-described embodiment. Thereby, the DC link capacitor power $p_C$ becomes zero.

According to this exemplary variation, the DC link voltage can be set to a temporally constant value while the target average speed of the motor is being output. Thereby, the capacity of the DC link capacitor can be reduced without requiring additional components.

(Second Exemplary Variation)

In the above-described embodiment, all the pulsations of the DC link voltage are compensated for by using the motor. However, compensation by the motor involves a tradeoff where the speed of the motor pulsates at a frequency that is twice the frequency of the input voltage as described above (FIG. 6C). This may be undesirable in some applications. In order to suppress the pulsations of the motor speed, not all but only a part of the input power pulsations may be compensated for by the motor, and the rest may be compensated for by the DC link capacitor.

Regarding the pulsation compensation of the DC link voltage, the proportion of the contribution by the motor is denoted as k ($0 < k \leq 1$) (hereinafter this k is referred to as a distribution coefficient). That is, $$p_{M,AC} = k^* p_{PFC,AC}$$

Note that $p_{M,AC}$ and $p_{PFC,AC}$ represent the fluctuation from the average value of motor power $p_M$ and the fluctuation from the average value of rectified power $P_{PFC}$, respectively ($p_M = <p_M> + p_{M,AC}$, $P_{PFC} = <P_{PFC}> + p_{PFC,AC}$). Therefore, the motor output is as follows.

$$p_M = <p_M> + p_{M,AC} = <p_M> + k^* p_{PFC,AC} = <P_{PFC}> - <p_C> + k^*(P_{PFC} - <P_{PFC}>) = K^* p_{PFC,AC} - <p_C> + (1-k)^* <P_{PFC}>$$

By selecting the distribution coefficient k with an appropriate value, it is possible to distribute compensation of the DC link voltage pulsation at a desired ratio between the motor and the DC link capacitor.

Figure 8:
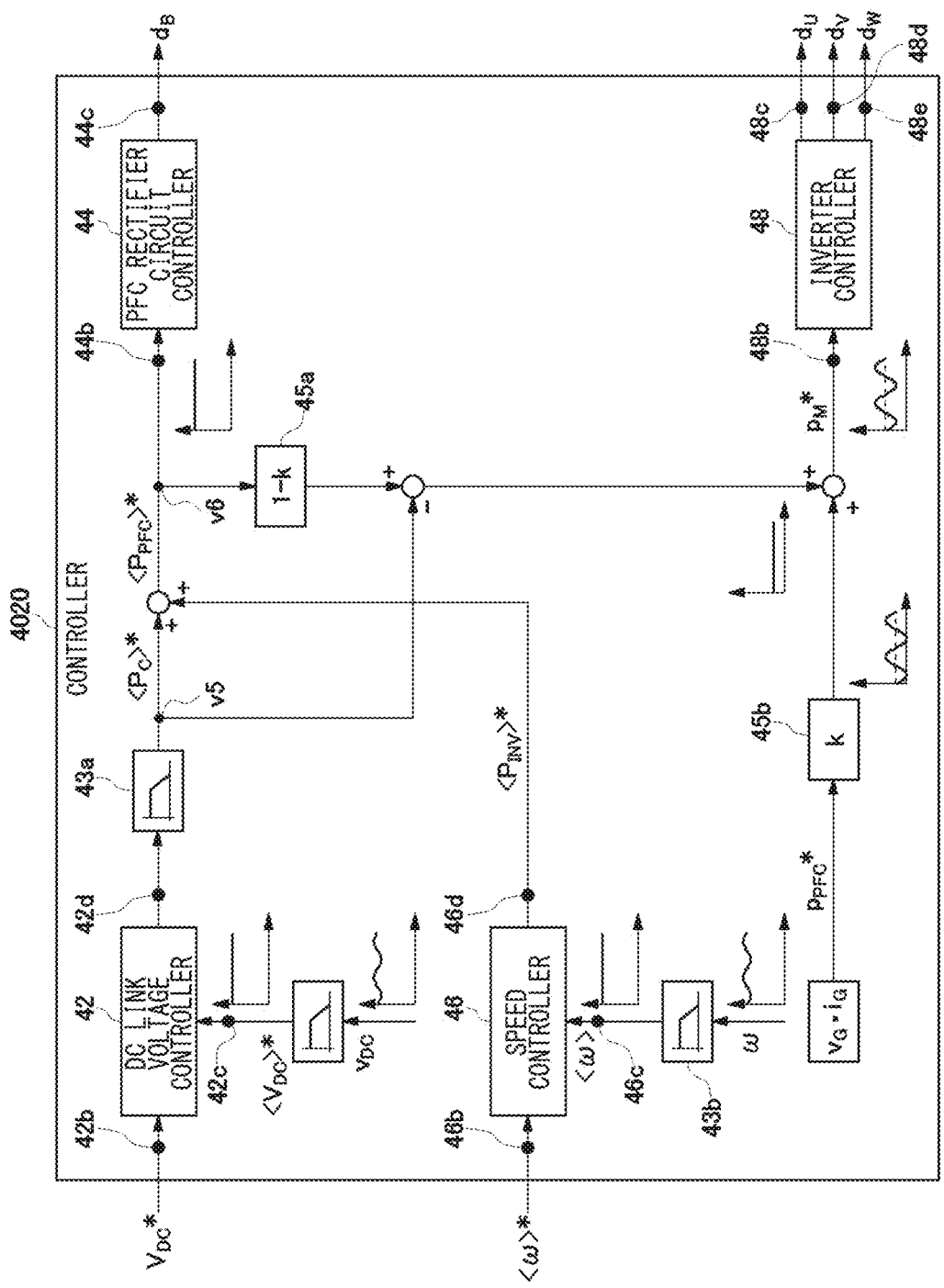
FIG. 8 is a block diagram showing an exemplary variation of the controller of the AC-AC power converter of FIG. 1.

FIG. 8 is a block diagram showing a controller 4020, which is an exemplary variation of the controller 40 of the AC-AC power converter 100 of FIG. 1. The configuration of the controller 4020 is different from the configuration of the controller 40 of FIG. 5 in that the controller 4020 further includes an attenuator 45a on the upstream side of the PFC rectifier circuit controller 44 and an attenuator 45b on the upstream side of the inverter controller 48. The attenuator 45a attenuates the intensity of the target average rectified power $<P_{PFC}>^*$ by 1−k times. The attenuator 45b attenuates the intensity of the target rectified power $P_{PFC}^*$ by k times. Other configuration of the controller 4020 is the same as the configuration of the controller 40.

The target average capacitor power $<P_C>^*$ from which high frequency components have been removed by the low pass filter 43a after the target average capacitor power <$P_C$>* is output from the output terminal 42d of the DC link voltage controller 42 is branched into two at a branch point v5. One <$P_C$>* branched at the branch point v5 is added to the target average inverter output <$P_{INV}$>* output from the output terminal 46d of the speed controller 46, and the target average rectified power <$P_{PFC}$>* is calculated. The calculated <$P_{PFC}$>* is branched into two at a branch point v6, and one is input to the input terminal 44b of the PFC rectifier circuit controller 44. The other <$P_{PFC}$>* branched at the branch point v6 is input to the attenuator 45a. <$P_{PFC}$>* is attenuated by 1−k times by attenuator 45a, and then <$P_C$>* branched at the branch point v5 is subtracted. The power represented by this (1−k)*<$P_{PFC}$>*−<$P_C$>* is added to target rectified power k*$p_{PFC}$* attenuated k times by the attenuator 45b and calculated as $p_M$* and is then input to the input terminal 48b of the inverter controller 48.

That is, $$p_M{}^* = k^* p_{PFC} - <P_C>^* + (1-k)<P_{PFC}>^*$$

According to the present exemplary variation, it is possible to distribute compensation of the DC link voltage pulsation at a desired ratio between the motor and the DC link capacitor. Thereby, the capacity of the DC link capacitor can be reduced while suppressing the pulsations of the speed of the motor.

(Third Exemplary Variation)

In the above-described embodiment, smoothing of the DC link voltage is realized by compensating for the pulsations of the DC link voltage vibrating at a frequency that is twice the frequency of the input voltage by the motor. However, in the actual implementation, the pulsations of the DC link voltage may have high frequency components such as those of four times (second order high frequency), eight times (fourth order high frequency), or 12 times (sixth order frequency) the frequency of the input voltage. High frequency noise generated by resonance of these high frequency components cannot be completely suppressed by the above-described technique alone. In this case, it is difficult to completely smooth the DC link capacitor voltage. In order to solve this problem, resonance control for suppressing high frequency noise may be added to DC link voltage control.

Figure 9:
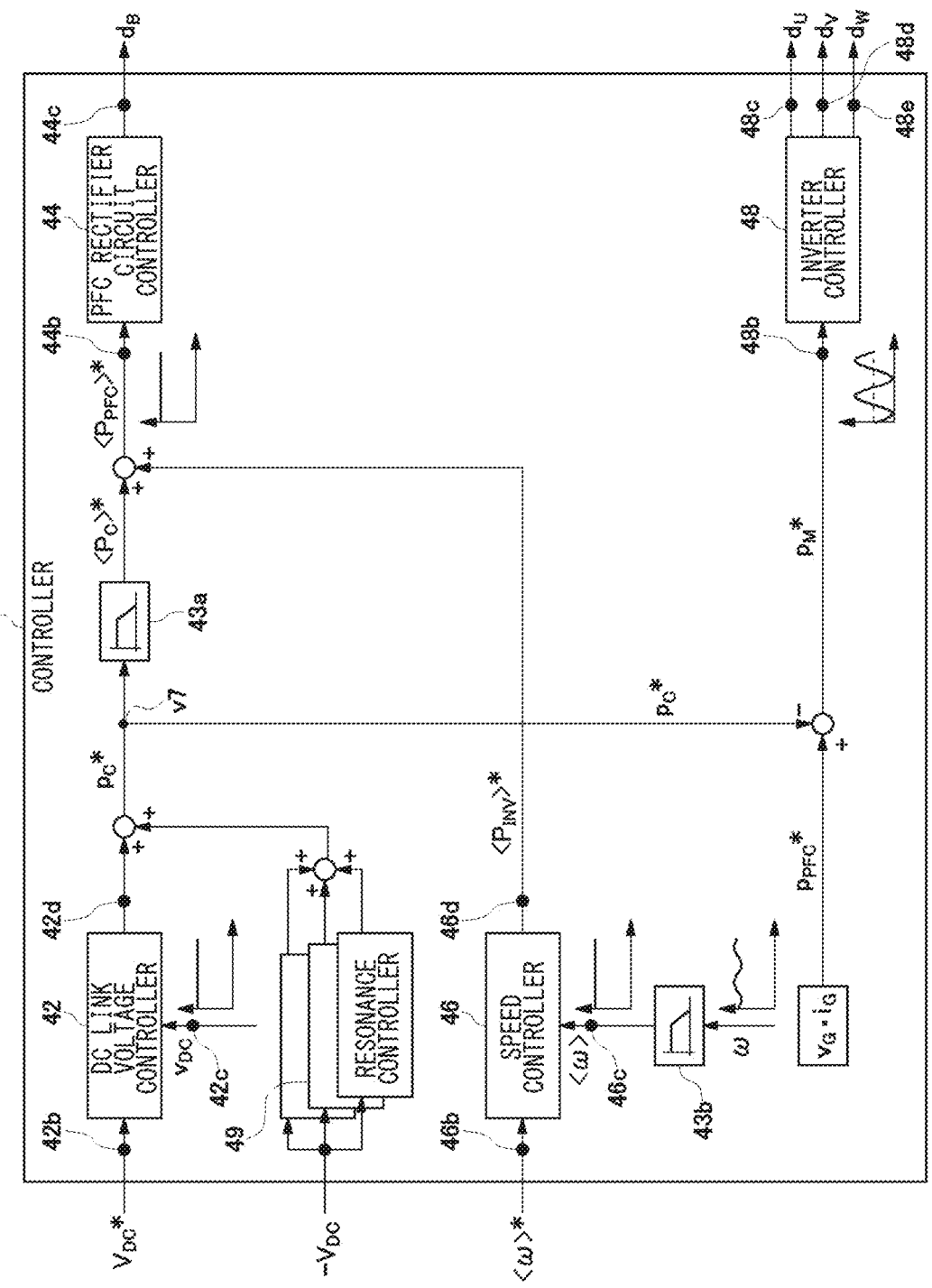
FIG. 9 is a block diagram showing an exemplary variation of the controller of the AC-AC power converter of FIG. 1.

FIG. 9 is a block diagram showing a controller 4030, which is an exemplary variation of the controller 40 of the AC-AC power converter 100 of FIG. 1. The configuration of the controller 4030 is different from the configuration of the controller 40 of FIG. 5 in that the controller 4030 further includes a resonance controller 49 on the upstream side of the PFC rectifier circuit controller 44. The same number of resonance controllers 49 as the number of high frequencies of the orders to be controlled are arranged. For example, in FIG. 9, three types of resonance controllers 49 for suppressing the second order high frequency, the fourth order high frequency, and the sixth order high frequency are shown. Other configuration of the controller 4030 is the same as the configuration of the controller 40.

Into the resonance controllers 49, −$v_{DC}$ obtained by inverting the polarity of the DC link voltage is input. Each of the resonance controllers 49 controls the high frequencies using the following function $G_{R,n}(s)$ and outputs target capacitor power relating to the high frequency of each order of the DC link voltage.

$$G_{R,n}(s) = \frac{2K_I \cdot s}{S^2 + (n \cdot \omega_G)^2} \quad (3)$$

In the expression, the gain is denoted as $K_I$, and the order of the high frequency is denoted as n. From the resonance controller 49, the target capacitor power relating to the high frequency of each order is output. The target capacitor power relating to the high frequency of each order that has been output is added to the target capacitor power output from the DC link voltage controller 42. Thereby, the target capacitor power $P_C$* whose high frequency noise is suppressed is generated. Other flows for the control and the signal are the same as those in the controller 40 of FIG. 5.

According to this exemplary variation, high frequency noise of the voltage pulsations of the DC link can be suppressed, and the DC link voltage can be smoothed with higher accuracy.

(Fourth Exemplary Variation)

In the above-described embodiment, the DC link voltage is the same as the input voltage. According to the voltage control of the present invention, since the pulsations of the DC voltage of the DC link is suppressed, for example, by placing a DC booster circuit on the downstream side of the DC link, the target DC link voltage can be set to a value higher than that of the input voltage.

Figure 10:
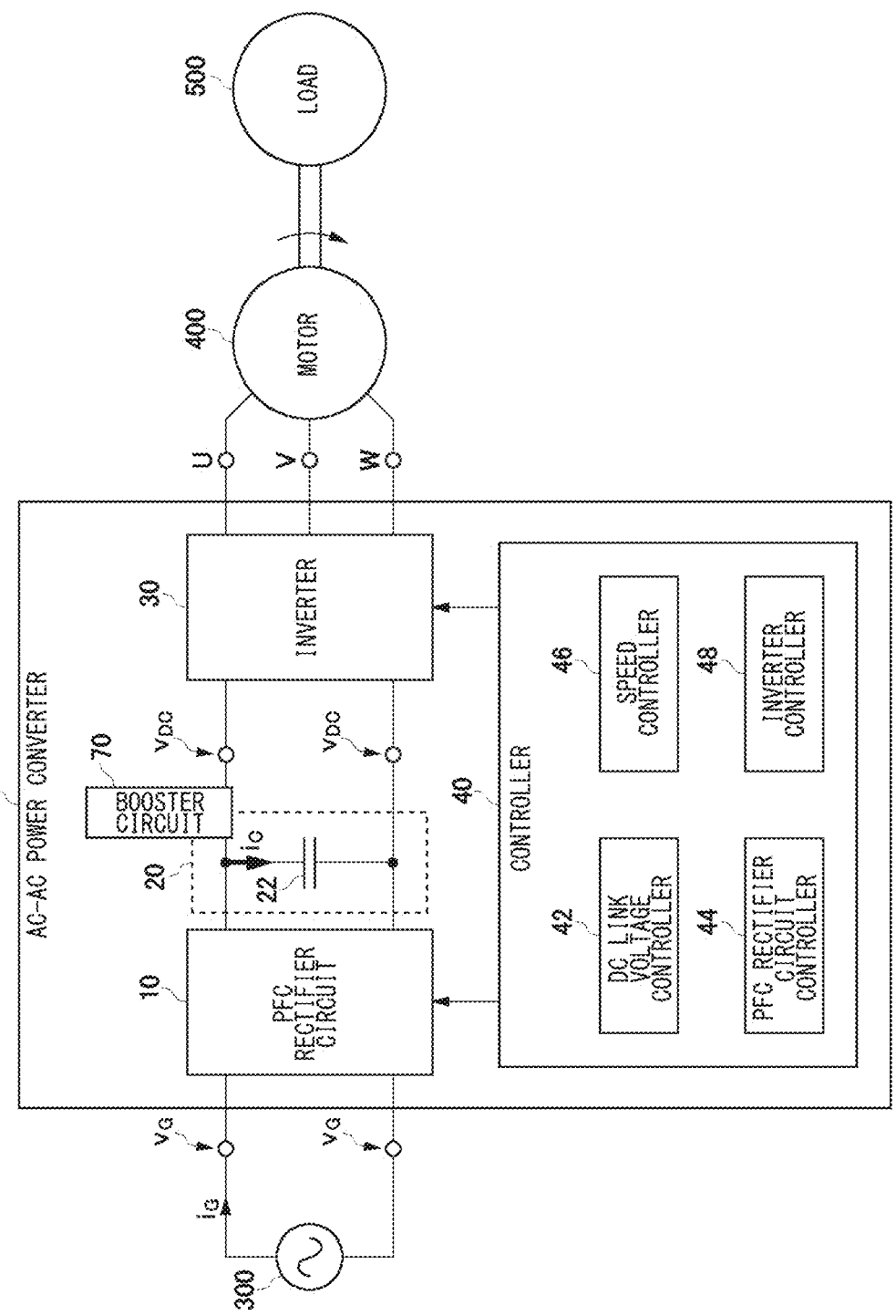
FIG. 10 is a block diagram showing an exemplary variation of the AC-AC power converter according to the embodiment.

FIG. 10 is a block diagram showing an AC-AC power converter 110, which is an exemplary variation of the AC-AC power converter 100 of FIG. 1. The AC-AC power converter 110 further includes a booster circuit 70 on the downstream side of the DC link 20, and other configuration of the AC-AC power converter 110 is the same as the configuration of the AC-AC power converter 100.

The booster circuit 70 boosts the DC link voltage smoothed due to pulsation compensation by the motor 400. For example, with regard to a single-phase AC voltage of 200 V supplied from the single-phase power source 300, the booster circuit 70 boosts a smoothed DC link voltage of 200 V by two times so as to generate a rectified voltage of 400 V and inputs the rectified voltage to the inverter 30. The inverter 30 generates a three-phase AC voltage of 400 V.

According to the present exemplary variation, a three-phase AC voltage that is higher than an input single-phase AC voltage can be obtained.

(Fifth Exemplary Variation)

One exemplary variation of the present invention is a method of controlling an AC-AC power conversion system. In other words, a method according to one aspect of the present invention is a method of controlling an AC-AC power conversion system. The AC-AC power conversion system comprises: a rectifier circuit for rectifying a single-phase AC voltage so as to generate a rectified voltage; an inverter for generating a three-phase AC voltage from the rectified voltage; and a DC link capacitor as an intermediate stage between the rectifier circuit and the inverter, wherein the method comprises: generating a sinusoidal input current from a single-phase AC voltage; supplying average input power and the pulsations of input power to the output side of the inverter; and matching the rectified voltage to a reference rectified voltage.

(Sixth Exemplary Variation)

One exemplary variation of the present invention is a method of controlling an AC-AC power conversion system. In other words, a method according to one aspect of the present invention is a method of controlling an AC-AC power conversion system. The AC-AC power conversion system comprises: a rectifier circuit for rectifying a single-phase AC voltage so as to generate a rectified voltage; an inverter for generating a three-phase AC voltage from the rectified voltage; and a DC link capacitor for compensating for a part of the pulsations of input power, wherein the method comprises: generating a sinusoidal input current from a single-phase AC voltage; supplying average input power and an adjustable part of the pulsations of the input power to the output side of the inverter; and matching an average rectified voltage to a reference rectified voltage.

In a method according to the fifth exemplary variation or the sixth exemplary variation of the present invention, a three-phase external device is connected to an inverter, and the pulsations of output power are compensated for by the inertia of the three-phase external device and the load thereof, and the method may further comprise matching the average rotational speed of the three-phase external device to reference rotational speed.

In the method according to the fifth exemplary variation or the sixth exemplary variation of the present invention, an AC-AC power conversion system may include a three-phase rectifier instead of a rectifier, wherein the three-phase rectifier is connected to a three-phase power source, and the method may further comprise compensating for input power pulsations that occur when imbalance occurs in the three-phase power source.

In the method according to the fifth exemplary variation or the sixth exemplary variation of the present invention, the AC-AC power conversion system may further include a resonance controller for reducing low frequency distortion.

The method according to the sixth exemplary variation of the present invention may further comprise outputting the pulsations of the input power dispersively to the external device and the DC link in accordance with conditions for time and load.

Figure 11:
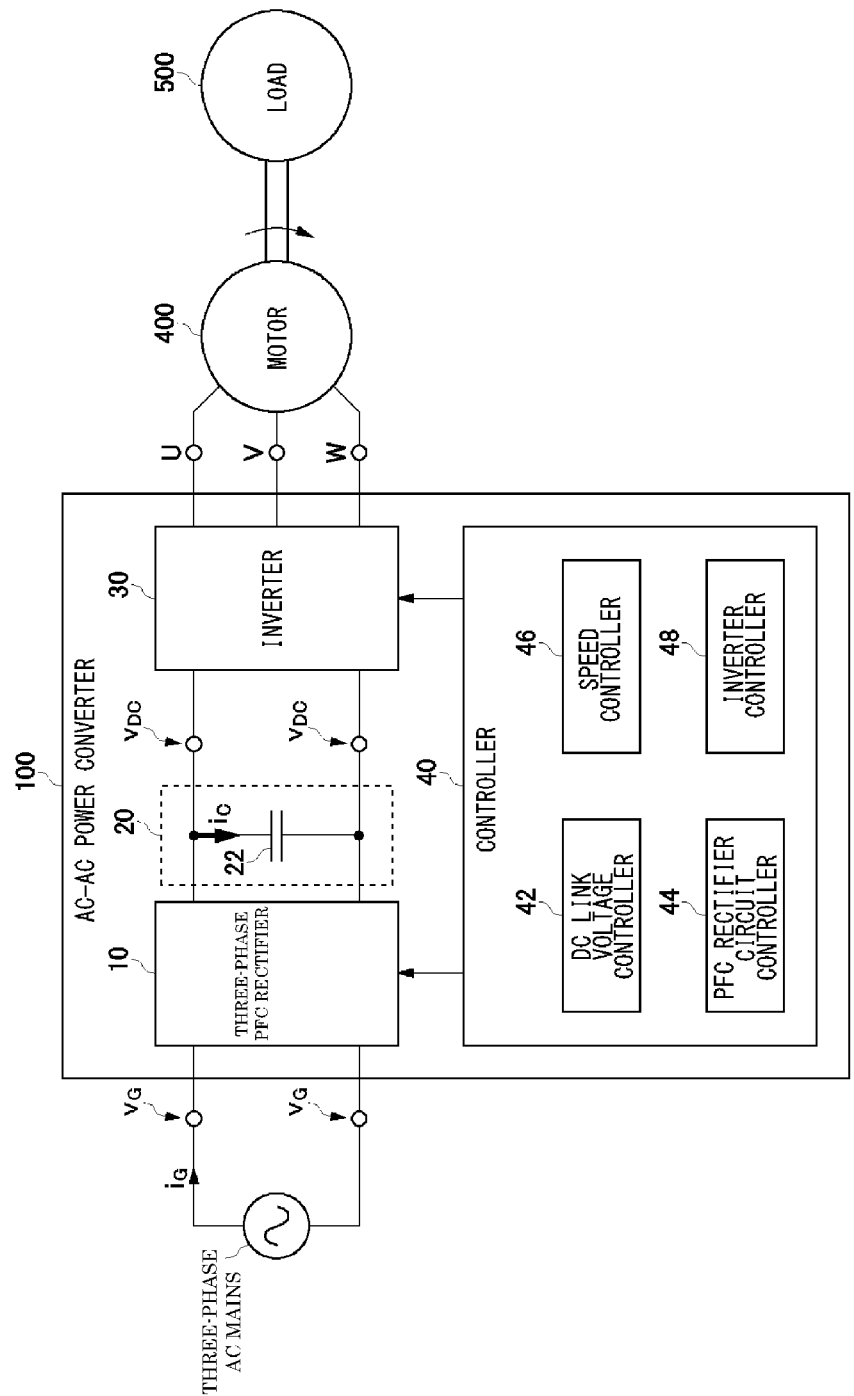
FIG. 11 is a block diagram showing an AC-AC power converter according to an embodiment.

FIG. 11 is a block diagram showing an AC-AC power converter according to an embodiment. In the embodiment, the three-phase PFC rectifier may be connected to three-phase AC mains.

What is claimed is:

1. An AC-AC power convertor for converting a first AC voltage to a second AC voltage, comprising:
    a rectifier circuit for rectifying the first AC voltage to generate a rectified voltage;
    an inverter for generating the second AC voltage from the rectified voltage; and
    a controller for controlling the rectifier circuit and the inverter,
    wherein the controller is configured to obtain a target capacitor power based on a difference between a target DC link voltage and a current value of the DC link voltage, to obtain a target motor power by subtracting the target capacitor power from a target rectified power, and to control the rectifier circuit and the inverter on a basis of the target capacitor power and the target motor power such that pulsations in the DC link voltage become zero and an output power of the inverter agrees with an input power of the rectifier circuit.

2. The AC-AC power convertor according to claim 1, wherein the controller controls the rectifier circuit and the inverter such that power generated by the first AC voltage is dispersively output to an external device and a DC link.

3. The AC-AC power convertor according to claim 1, further comprising a resonance controller for controlling higher frequencies contained in the pulsations of power output to the rectifier circuit.

4. The AC-AC power convertor according to claim 1, comprising a booster circuit in between the rectifier circuit and the inverter.

5. Method to control an AC-AC converter system, comprising
    a rectifier circuit, to rectify a (first) single-phase AC voltage into a DC-voltage,
    a DC link capacitor, as intermediate stage between the rectifier and an inverter, and
    the inverter, to generate a (second) three-phase AC voltage from the DC-voltage, whereby, the rectifier circuit and the inverter are controlled in order to
    draw a sinusoidal input current from the (first) single-phase voltage,
    deliver an average input power plus an input power pulsation to the output of the inverter,
    achieve a DC voltage equal to the reference DC voltage,
    obtain a target capacitor power based on a difference between a target DC link voltage and a current value of the DC link voltage, and to
    obtain a target motor power by subtracting the target capacitor power from a target rectified power,
    wherein the rectifier circuit and the inverter are controlled on a basis of the target capacitor power and the target motor power such that pulsations in the DC link voltage become zero and an output power of the inverter agrees with an input power of the rectifier circuit.

6. Method according to claim 5, whereby a three-phase machine is connected to the inverter, in order to cover the output power pulsation by means of the rotating mass of the three-phase machine and the mechanical load, and to match an average rotational speed of the three-phase machine to a reference rotational speed.

7. The AC/AC converter system of claim 5, which further comprises a resonance controller within the DC-voltage or rectifier control to reduce low-frequency distortions.

8. Method to control an AC-AC converter system, comprising
    a rectifier circuit, to rectify a (first) single-phase AC voltage into a DC-voltage,
    a DC link capacitor, to cover a part of an input power pulsation, and
    an inverter, to generate a (second) three-phase AC voltage from the DC-voltage, whereby, the rectifier circuit and the inverter are controlled in order to
    draw a sinusoidal input current from the (first) single-phase voltage,
    deliver an average input power plus an adjustable fraction of the input power pulsation to an output of the inverter,
    achieve an averaged DC voltage equal to the reference DC voltage,
    obtain a target capacitor power based on a difference between a target DC link voltage and a current value of the DC link voltage, and to
    obtain a target motor power by subtracting the target capacitor power from a target rectified power,
    wherein the rectifier circuit and the inverter are controlled on a basis of the target capacitor power and the target motor power such that pulsations in the DC link voltage become zero and an output power of the inverter agrees with an input power of the rectifier circuit.

9. Method according to claim 8, whereby pulsations of the input power are dispersively output to an external device and the DC link in accordance with conditions for time and load.

* * * * *